United States Patent
Tay

(10) Patent No.: US 6,953,413 B2
(45) Date of Patent: Oct. 11, 2005

(54) AXIAL POSITION CHANGING TRANSMISSION MECHANISM

(76) Inventor: Armin S. Tay, 2599 E. Temple Ave., Apt. I, West Covina, CA (US) 91792

(*) Notice: Subject to any disclaimer, the term of this patent is extended or adjusted under 35 U.S.C. 154(b) by 377 days.

(21) Appl. No.: 10/332,085

(22) PCT Filed: May 30, 2001

(86) PCT No.: PCT/US01/17654
§ 371 (c)(1),
(2), (4) Date: Jan. 4, 2003

(87) PCT Pub. No.: WO01/98685
PCT Pub. Date: Dec. 27, 2001

(65) Prior Publication Data
US 2005/0014599 A1 Jan. 20, 2005

Related U.S. Application Data

(63) Continuation of application No. 09/620,282, filed on Jul. 20, 2000, now abandoned.
(60) Provisional application No. 60/212,259, filed on Jun. 19, 2000.

(51) Int. Cl.$^7$ .............................................. F16H 15/16
(52) U.S. Cl. .............................. 476/22; 476/21; 74/448
(58) Field of Search ........................ 476/21, 22; 74/448

(56) References Cited

U.S. PATENT DOCUMENTS

| | | | | | |
|---|---|---|---|---|---|
| 470,952 A | * | 3/1892 | Scholfield | ..................... | 474/96 |
| 644,442 A | * | 2/1900 | McElroy | ..................... | 476/72 |
| 706,664 A | * | 8/1902 | Jackson | ..................... | 475/217 |
| 799,148 A | * | 9/1905 | Davis | ..................... | 476/21 |
| 986,712 A | * | 3/1911 | Hipp | ..................... | 74/448 |
| 1,207,216 A | * | 12/1916 | Roberts | ..................... | 476/19 |
| 1,412,116 A | * | 1/1922 | Hornby | ..................... | 74/448 |
| 3,496,791 A | * | 2/1970 | Gabriel | ..................... | 74/409 |
| 4,111,064 A | * | 9/1978 | Purcell | ..................... | 474/162 |
| 5,179,865 A | * | 1/1993 | Line | ..................... | 476/51 |

FOREIGN PATENT DOCUMENTS

| | | | |
|---|---|---|---|
| FR | 2 581 433 | * | 5/1985 |
| JP | 2-304239 | * | 12/1990 |
| WO | WO 93/02302 | * | 7/1991 |

* cited by examiner

Primary Examiner—David M. Fenstermacher
(74) Attorney, Agent, or Firm—Armin Tay

(57) ABSTRACT

A mechanism (25) for transmitting torque from one or between several torque transmitting members (14A, 16A) for which sliding in the axial direction between the torque transmitting surface(s) of the mechanism (25) and the member(s) (14A, 16A) is eliminated when the mechanism (25) is moved relative to the surfaces of the members (14A, 16A) in the direction along the axis of the mechanism (25). This is achieved by dividing the torque transmitting surfaces of the mechanism (25) into several segments (30A, B, C, D), where during any instance a/the member(s) (14A, 16A) is/are in contact with at least one segment (30A, B, C, D) and at least one segment (30A, B, C, D) is not in contact with any member (14A, 16A). During the rotation of the mechanism (25) the segments (30A, B, C, D) alternately come in and out of contact with the members (14A, 16A). When the mechanism (25) is being moved to a new desired axial position, only the segments (30A, C) not in contact with a member (14A, 16A) will be moved, while the segments (30B, D) contact with a member (14A, 16A) will be moved after the mechanism (25) has rotated so that the segments (30A, B) that were in contact with a member (14A, 16B) are free.

10 Claims, 2 Drawing Sheets

AXIAL POSITION CHANGING TRANSMISSION MECHANISM

CROSS REFERENCE TO RELATED APPLICATIONS

This invention is entitled to the benefit of Provisional Patent Application Ser. No. 60/212,259 Filed on Jun. 19, 2000. This is a continuation of Ser. No. 09/620,282 and Filed on Jul. 20, 2000 now abandoned.

FIELD OF INVENTION

This invention relates to continuous variable transmissions (CVTs), specifically to a transmission mechanism that when used in several existing CVTs will eliminate friction losses and wear between the torque transmitting surfaces that is typically generated when the transmission ration is changed.

DESCRIPTION OF PRIOR ART

In most machinery applications the transmission ratio, which is the torque vs. speed ratio provided by driving source (motor, engine, person, etc.), needs to be adjustable in order for the driving source to operate efficiently and effectively. For example, during start-up a relatively large torque is needed to speed up the equipment to be driven from rest to a desired operating speed. Once the equipment has reached it's desired operating speed, no torque is needed to speed-up the machine. Therefore, the torque requirement at the operating speed is most likely less than the torque requirement during start up. However, at the operating speed the speed requirement of the driving source is higher, since the desired operating speed of the equipment is higher than during start up. From the example above it can be seen that during start up, the driving source needs to provide a relatively large torque but only needs to operate at a relatively low speed. But once the equipment has reached its operating speed, the driving source needs to provide a relatively small torque but operate at relatively high speed Here a relatively large torque would be wasteful and make the driving source inefficient. Hence, in order to increase the efficiency of a driving source, most machines have a transmission, which can vary the driving source's transmission ratio.

Many machines use discrete variable transmissions, where the operator can only select between several discrete transmission ratios. A continuous variable transmission (CVT) on the other hand can provide an infinite amount of transmission ratios within a predetermined range. If the overall transmission ratio range of a discrete variable transmission is equal to that of a CVT, in almost all instances the CVT can provide the driving source with a more efficient transmission ratio.

Despite it obvious advantages, most machines that require frequent transmission ratio changes use discrete variable transmissions. One reason for this is that in many existing CVTs, including the ones used as an example in this application, sliding between the torque transmitting surfaces is necessary in order to change the transmission ratio. This will significantly reduce the life of the CVT and require a large actuating force in order the change the transmission ratio of the CVT.

One well-known form of a CVT consists of a driving cone mounted on a driving shaft driving a driven cone mounted on a driven shaft. The driving cone is coupled to the driven cone by a transmission mechanism, which is a wheel. The wheel is placed between the surfaces of the driving cone and driven cone so that its outer surface is tangent to the surfaces of the cones (see FIG. 1). The transmission ratio between the driving shaft and the driven shaft is determined by the location of the wheel on the surfaces of the cones. In order to change the transmission ratio, the wheel is slid continuously relative to the surfaces of the cones while the cones and the wheel are rotating. In order to transmit sufficient torque between the cones, the friction between the wheel and the cones has to be sufficiently large. Therefore, a substantial amount of sliding friction must be overcome during the change of transmission ratio. Overcoming this substantial sliding friction and the damage that is inflicted on the wheel as it is being slid along the surfaces of the cones are inherent problems that are a major reason why the variable transmission has not been universally adopted.

SUMMARY

It is an object of this invention to provide a transmission mechanism for transmitting torque between two members (e.g. a cone on a driving member and a cone on a driven member) where sliding between the torque transmitting surfaces that occur when the transmission ratio is being changed is eliminated

OBJECTS AND ADVANTAGES

In applying principles of this invention to various CVTs, the objects and advantages of the present invention are:

a) To provide a transmission wheel that replaces the wheel of an existing CVT (see FIG. 1), which eliminates sliding between the torque transmitting surfaces that characterizes present state of art which will:

1) substantially reduce the actuation force needed in order to change the transmission ratio.
2) substantially reduce the wear that would otherwise occur due to sliding between the torque transmitting surfaces when the axial location of the wheel is being changed.

b) It is another object of this invention to increase the efficiency of driving sources by eliminating some inherent problems of existing CVTs so that the CVTs can replace discrete variable transmissions.

c) It is another object of this invention to introduce a method for changing the axial location of one torque transmitting member relative to another/several other torque transmitting member(s) without sliding between the torque transmitting surfaces of the members due to the actuating force, which acts along the axis of the member being moved.

DRAWING FIGURES

REFERENCE NUMERALS IN DRAWINGS

14A Driving Cone
14B Driving Disk

12 Driving Shaft
16A Driven Cone
16B Driving Disk
18 Driven Shaft
22 Transmission Wheel Shaft
25 Transmission Wheel
30A Transmission Wheel Segment
30B Transmission Wheel Segment
30C Transmission Wheel Segment
30D Transmission Wheel Segment
32A Left Transmission Wheel Cover Plate
32B Right Transmission Wheel Cover Plate
34 Transmission Wheel Pin
36 Transmission Wheel Spring

DESCRIPTION OF INVENTION

Preferred Embodiments

Figure 1:
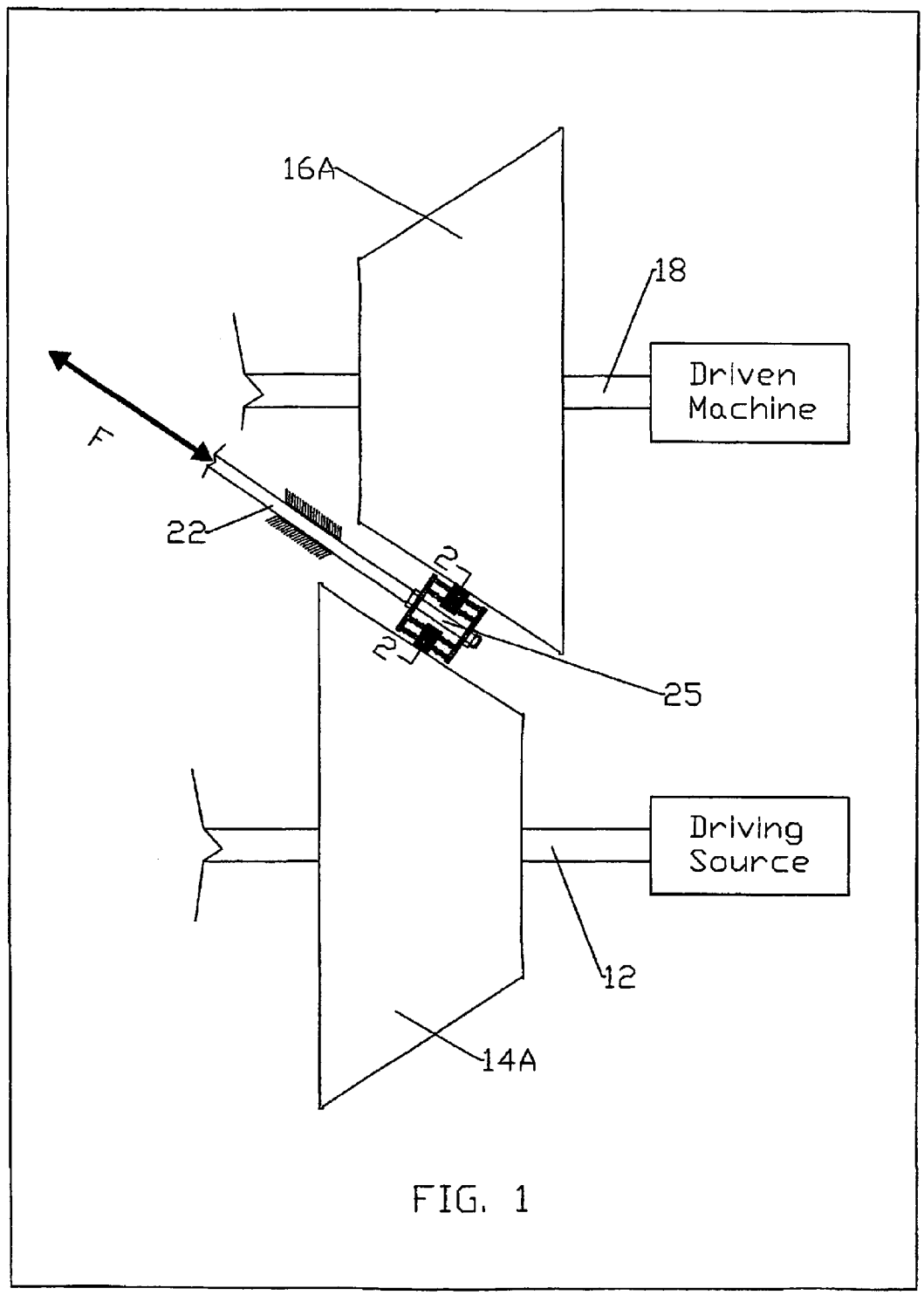
FIG. 1 is a sectional-view of an existing CVT that utilizes a transmission wheel of this invention. At present state this CVT uses a regular wheel.

An existing CVT that utilizes a transmission wheel of this invention is shown in FIG. 1. Here the mechanism of this invention, transmission wheel 25, is used to couple a driving member, cone 14A, to a driven member cone 16A. The transmission wheel 25 is mounted to rotate on shaft 22. Shaft 22 is moveable along its length, so that transmission wheel 25 is moveable relative to the surfaces of cone 14A and cone 16A.

Figure 2:
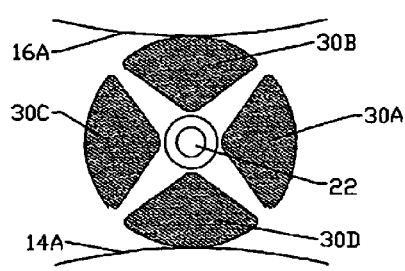
FIG. 2 is a sectional-view of FIG. 1 showing the segments of the transmission wheel.

The transmission wheel 25 consists of four segments, which are shown in FIG. 2. The four segments 30A, 30B, 30C, and 30D are attached to a rotating frame as to form a continuous surface through which torque between cone 14A and cone 16A is transmitted. During the rotation of transmission wheel 25, the segments (30A, B,C, & D) will alternately come in and out of contact with the surfaces of the cones. The segments are rotatably constrained from each other by pins 34, but are able to slide independently of each other on pins 34. In order to reduce the friction that is generated when the segments are slid on pins 34, pins 34 should be made out of a low friction material, such a PTFE or oil-impregnated bronze for example. Pins 34 are securely placed between cover plate 32A and cover plate 32B, and are parallel to shaft 22. In order to properly maintain the position of the segments so that they form a continuous surface through which torque can be transmitted, each segment is mounted on two pins 34, an inner pin, closest the center of cover plates 32A&B, and an outer pin. Two springs 36 are placed on every outer pin 34. One spring is placed between the left cover plate 32A and a segment (30A/30B/30C/30D), and the other spring is placed between the right cover plate 32B and that segment In absent of any axial forces on the segments, the springs 34 will bias the axial position of the segments toward the center of the frame. Here the frame refers to cover plate 32A, cover plate 32B, and pins 34. However if a sufficient axial force is applied on the segments, then the segments will move in the direction of the applied axial force relative to the frame.

Figure 5:
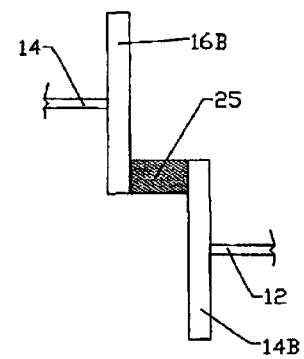
FIG. 5 is a side-view of another existing CVT hat can utilize a transmission wheel of this invention. At present state this CVT uses a regular wheel.
Figure 3:
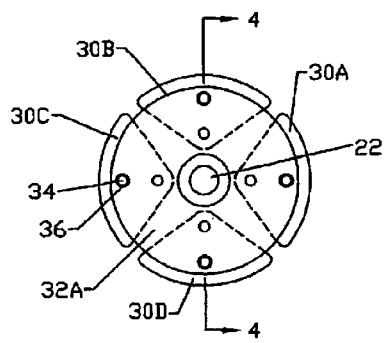
FIG. 3 is a detailed view of FIG. 2
Figure 4:
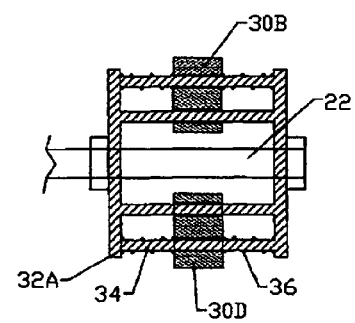
FIG. 4 is a sectional-view of FIG. 3

Transmission wheel 25 can be used in other CVTs not described in this application. One CVT which performance can also be improved by transmission wheel 25 is shown in FIG. 5. Here the transmission wheel 25 can be used to couple a driving disk 14B to a driven disk 16B.

Alternate Embodiments

The method of changing the axial location of one torque transmitting member relative to another or several others, without any sliding between torque transmitting surfaces of the members can be applied to construct other mechanical devices such as pulley or belts for example, which then can be used to construct better performing CVTs. The basic method of this invention is to divide at least one member into several segments so that the other/every other member is in contact with at least one segment, and at least one segment is out of contact with the other member(s). Furthermore, the change of location of one member relative to the other(s) is achieved by only moving the segment(s) that are not in contact with any other member.

Operation

For the CVT shown in FIG. 1 torque from the driving source is transmitted to an equipment via driving shaft 12, driving cone 14A, transmission wheel 25, driven cone 16A, and driven shaft 18. The transmission ratio (speed vs. torque ratio) for that CVT is determined by the location of the segments 30A, 30B, 30C, and 30D on the surface of cone 14A and the surface of cone 16A. During normal operation, where the CVT operates at its desired transmission ratio, no actuating force F, which is applied in the direction along the length of shaft 22, is applied on transmission wheel 25. Therefore during normal operation, the segments 30A, 30B, 30C, and 30D are positioned towards the center of the frame of the transmission wheel 25. Hence, during normal operation, the transmission ratio depends on the location of transmission wheel 25 relative to cone 14A and cone 16A.

In order to change the transmission ratio, the location of transmission wheel 25 relative to cone 14A and cone 16A needs to be changed. This is achieved by applying an actuating force F along the length of shaft 22.

In order to explain the operation of transmission wheel 25, we use an instantaneous situation where an actuating force F is applied on transmission wheel 25 while segments 30B and 30D are in contact with the cones (see FIG. 2). Here friction between the surfaces of the cones and segments 30B and 30D prevent segments 30B and 30D from moving in the direction of the actuating force F. Since the segments can slide relative to the frame of transmission wheel 25, the frame of transmission wheel 25 will be moved by the actuating force F, while segments 30B and 30D will remain at their instantaneous location. Hence sliding between the surfaces of the cones and the torque transmitting surfaces of transmission wheel 25 is avoided. Also since at this instance segments 30A and 30C are not in contact with the surfaces of the cones, they will move with the frame of the transmission wheel 25 to the new desired location. After transmission wheel 25 has rotated 90°, segments 30B and 30D will be out of contact with the cones so that springs 36 will force them back towards the center of the frame. So after a 90° rotation, the location of the transmission wheel 25 relative to the surface of the cones has been changed without any sliding between the torque transmitting surfaces of the transmission wheel 25 and the surface of the cones due to the actuating force F.

Conclusion, Ramification, and Scope

Accordingly, the reader will see that the transmission wheel of this invention can be used to the increase the life and reduce the required actuating force for transmission ratio change in several existing CVTs. Hence the transmission wheel of this invention will not only improve the performance of several existing CVTs, but can also increase the efficiency of driving sources such as motors or engines that currently use discrete variable transmissions by eliminating some of the inherent problems of existing CVTs so that they can replace the less efficient discrete variable transmissions.

While my above description contains many specificities, these should not be construed as limitation on the scope of the invention, but rather as an exemplification of one preferred embodiment thereof Many other variations are possible. For example, the method of dividing a torque transmitting mechanism into several segments in a manner such that sliding between the torque transmitting segments that is typically being generated when the position of one torque transmitting segment is changed relative to another is eliminated can be applied to pulleys. For example, a well known existing CVT consist of a V-belt pulley, which consist of two halves, where the pitch diameter of the pulley can be changed by changing the axial distance between the two halves. The pitch diameter of the pulley is increased by pushing the two halves closer together, which will slide the V-belt on the surfaces of the pulley halves to the desired new pitch diameter. In order to increase the life of the V-belt and reduce the required actuation force, at least one half of the pulley can be made segmented using the method described in this Application.

Accordingly, the scope of the invention should be determined not by the embodiments illustrated, but by the appended claims and their legal equivalents.

I claim:

1. Method for changing the axial location of one torque transmitting member relative to another torque transmitting member without any sliding between the torque transmitting surfaces of said torque transmitting members due to the change in the axial location of one said member comprising of steps:
   (a) segmenting at least one said member into a plurality of segments, where at least one said segment is in contact with the other said member and one segment is out of contact with the other said member.
   (b) attaching said segments in such a manner as to rotatably constrain the position of said segments relative to each other, but allow said segments to slide independently of each other in the axial direction of said segmented member.
   (d) only moving said segments on said segmented member out of contact with other said member to a new desired axial location.

2. Means for transmitting torque between a driving member and a driven member, which can be moved in the direction of its axis of rotation without any sliding between the surface of said means for transmitting torque and the surface of said driving member and the surface of said driven member, comprising:
   (a) A plurality of torque transmitting segments arranged in a manner so that at any instance at least one said segment is in contact with said driving member, one said segment is in contact with said driven member, and one said segment is out of contact with said driving member and said driven member
   (b) means for mounting said segments in a manner such that said segments are able to transmit torque between said driving member and said driven member
   (c) means for mounting said segments in a manner such that when a force is applied along the axis of said means for transmitting torque, said segment in contact with said driving cone and said segment in contact with said driven cone will maintain their axial position, while segments not in contact with said driving cone and said driven cone will move in the direction of said force whereby by only moving said segments not in contact with said driving member and said driven member to new desired axial position, sliding between torque transmitting surfaces of said means for transmitting torque and said driving member and said driven member is eliminated.

3. The means for transmitting torque of claim 2 which comprises of:
   a) a plurality of torque transmitting segments
   b) a frame on which said segments are mounted in a manner such that the rotational position of said segments relative to each other is fixed, but said segments are free to move independently of each other along the axial direction of said means for transmitting torque.

4. The means for transmitting torque of claim 3 for which said frame comprises of:
   (a) a plurality of pins on which said segments are slidably mounted, each said segment is mounted on two said pins to maintain the radial shape of said segments
   (b) two cover plates which sandwich the said pins and fix the position of said pins.

5. The means for transmitting torque of claim 4 for which said segments are biased toward the center of said frame.

6. The means for transmitting torque of claim 5 for which said segments are biased toward the center of said frame by springs.

7. The means for transmitting torque of claim 5 for which said means for biasing said segments toward the center of said frame comprises a plurality of springs mounted on said pins, where each segment is sandwiched by at least one pair of springs.

8. The means for transmitting torque of claim 7 for which the number of said segments is four.

9. A continuous variable transmission, comprising:
   (a) a driving cone mounted on a driving shaft
   (b) a driven cone mounted on a driven shaft, and attached in a manner so that said driving shaft is parallel to said driven shaft and apex of said driving cone is opposite of said apex of said driven cone;
   (c) the means for transmitting torque of claim 2 or claim 7, which couples said driving cone with said driven cone.

10. A continuous variable transmission, comprising:
   (a) a driving disk mounted on a driving shaft
   (b) a driven disk mounted on a drive shaft, mounted in a manner such that: driving disk is parallel to said driven disk, and outer diameter of said driving disk is facing the center of said driven disk;
   (c) the means for transmitting torque of claim 2 or claim 7, which couples said driving disk with said driven disk.

* * * * *